United States Patent
Ryan et al.

[15] 3,656,619
[45] Apr. 18, 1972

[54] APPARATUS AND METHOD FOR REMOVING FLOATING POLLUTANTS FROM A BODY OF WATER

[72] Inventors: Donald J. Ryan, 1826 N. 24th Street; Winston P. Ledet, 1812 N. 24th Street; James R. Colvin, 1818 N. 24th Street, all of Orange, Tex. 77630

[22] Filed: Aug. 3, 1970
[21] Appl. No.: 60,287

[52] U.S. Cl. ................................ 210/83, 210/242, 210/512, 210/DIG. 21
[51] Int. Cl. ........................................................ E02b 15/04
[58] Field of Search ................ 210/DIG. 21, 242, 83, 84, 512

[56] References Cited

UNITED STATES PATENTS

| | | | |
|---|---|---|---|
| 2,876,903 | 3/1959 | Lee | 210/242 |
| 3,245,539 | 4/1966 | Earle | 210/242 |
| 3,348,690 | 10/1967 | Cornelissen | 210/242 |

Primary Examiner—J. L. De Cesare
Attorney—Pravel, Wilson & Matthews

[57] ABSTRACT

Apparatus and method for removing floating pollutants such as crude oil from a body of water, wherein separator means is towed, propelled or is otherwise moved through the body of water for directing the floating pollutants with a minimum of the water through the separating means, whereby the pollutants may be rapidly removed from the body of water with substantially no mixing and emulsifying of the pollutant with the water.

11 Claims, 5 Drawing Figures

Donald J. Ryan
Winston P. Ledet
James R. Colvin
INVENTORS

BY

Pravel, Wilson & Matthews
ATTORNEYS

Donald J. Ryan
Winston P. Ledet
James R. Colvin
INVENTORS

BY

Pravel Wilson & Matthews
ATTORNEYS

APPARATUS AND METHOD FOR REMOVING FLOATING POLLUTANTS FROM A BODY OF WATER

BACKGROUND OF THE INVENTION

The field of this invention is apparatus and methods for removing floating pollutants such as crude oil from a body of water.

In recent years, and more especially in recent months, the problem of pollution by crude oil in inland and offshore areas of the United States has become of paramount importance. A number of different approaches have been taken in an attempt to solve the problem, but so far as is known, none of the approaches heretofore taken have been satisfactory. For example, chemicals have been applied to the floating oil to cause a chemical reaction or to otherwise increase its density and cause it to sink. Floating porous glass beads have been distributed in the oil and then the oil has been burned on the surface of the water. Corralling devices which float on the water and encircle the oil slick have been used also and these seem to have had the widest use recently, but they suffer from at least two disadvantages, namely, (1) the inability to function properly in rough seas, and (2) very low or zero operating speed which prevents the pick up of oil which escapes from the corralling device.

SUMMARY OF THE INVENTION

The present invention relates to an apparatus and method for picking up oil or other similar floating pollutants by moving a separator means through the water. The velocity of the separator means is used at least in part to create separating forces in the separator means. Also, the apparatus can operate in rough water due to its low length to width ratio, and because of its high speed, any pollutants which escaped during the period of rough water may be reached and rapidly picked up. When the oil is picked up by the present apparatus at the surface of the water some water at the interface is also picked up and this is separated in the apparatus so that the oil can be temporarily stored on the apparatus or on another floating unit for transportation to a storage point on land or other location.

DESCRIPTION OF THE PREFERRED EMBODIMENT

Figure 1:
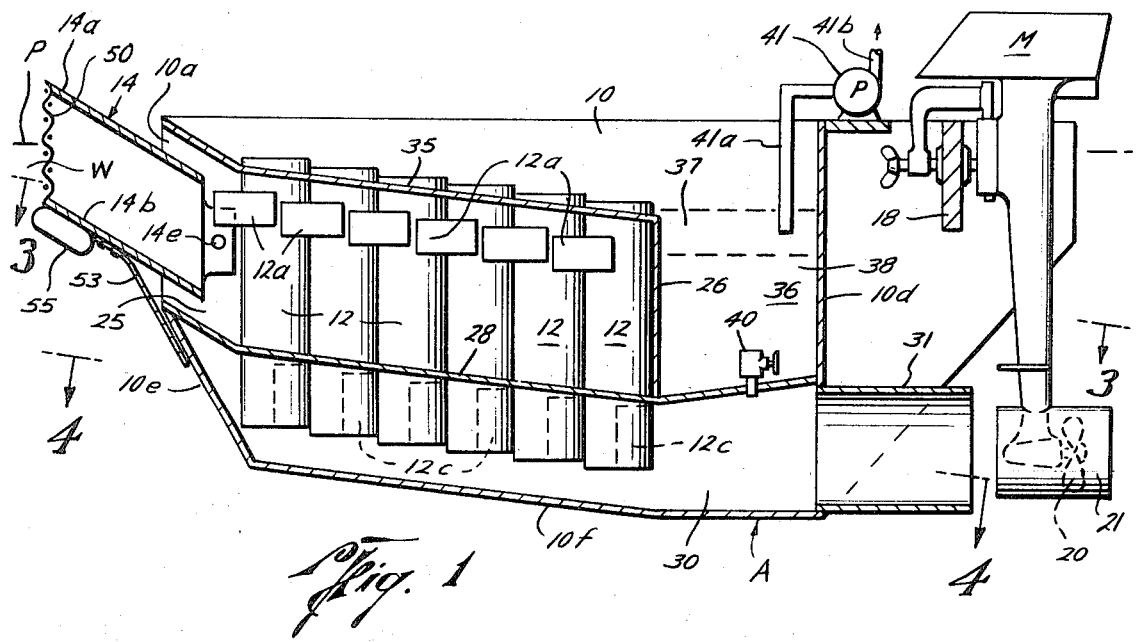
FIG. 1 is a vertical sectional view, partly in elevation, of the preferred form of the pollution control apparatus of this invention.
Figure 2:
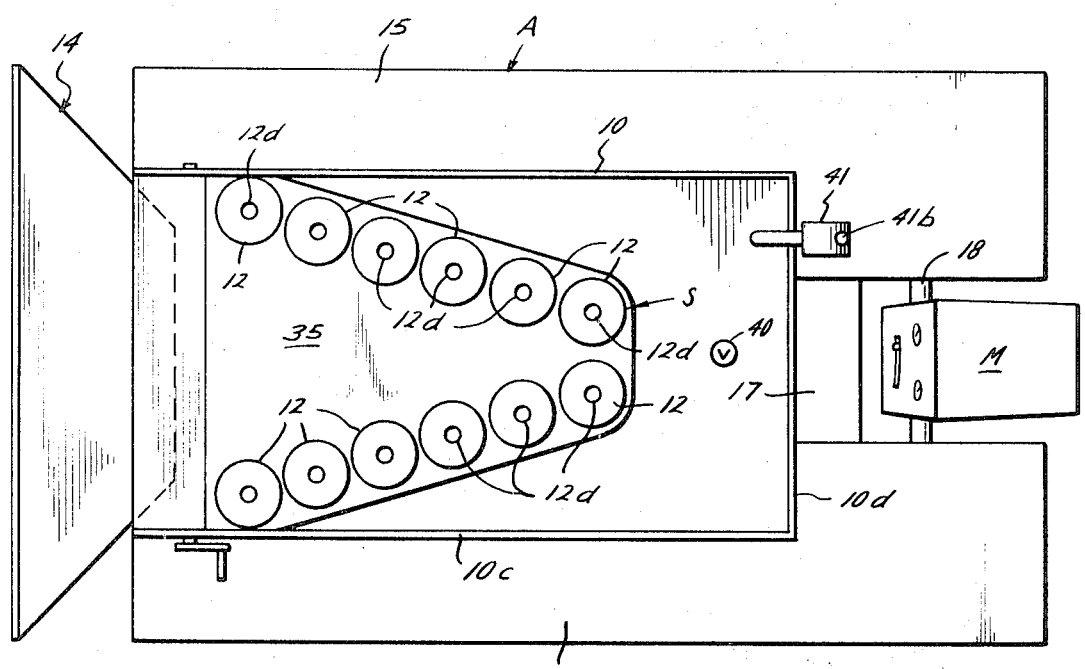
FIG. 2 is a plan view of the apparatus of FIG. 1.

In the drawings, the letter A designates generally the pollution control apparatus of this invention which is adapted to move along in a body of water and pick up oil or other pollutant floating on the surface of the water so that upon subsequent separation of the oil from the water, the water may be returned to the body of water and the oil may be stored or transported to land or other location. Briefly, the apparatus A includes a hull 10 which has an inlet opening 10a in one wall for providing an inlet for liquid into the hull 10 where a plurality of separator units 12 forming a separator means S are disposed for receiving liquid. The separator means S separates the incoming liquid into the oil and the water components, as will be explained. Preferably, a mouth 14 is mounted adjustably at the front of the hull 10 so as to control the depth or level at which the water W and the pollutant P such as crude oil, are scooped or skimmed for entry through the inlet 10a into the hull 10 for reception by the separator means S. Any suitable flotation means such as tanks 15 and 16 having air therein are provided with the hull 10 for floating the entire apparatus A at a relatively low level in the body of water W, whereby the apparatus A has a low visible silhouette so that it is subjected to little effect from wind and wave action in rough seas.

Considering the invention more in detail, the hull 10 is formed with side plates 10b and 10c, a rear hull plate 10d and a forward hull plate 10e in which the opening 10a is formed. The hull 10 also includes a bottom plate 10f.

The flotation tanks 15 and 16 are hollow tanks which are preferably separately formed and are then welded or otherwise secured to the sides 10b and 10c, respectively, of the hull 10. It should be appreciated that the flotation tanks 15 and 16 may be incorporated as a part of the hull 10 rather than being separately made and mounted as illustrated in the preferred form of the invention. The tanks 15 and 16 are preferably interconnected by a plate 17 at the rear of the hull 10 which plate is welded or is otherwise secured to the tanks 15, 16 and the rear wall 10d of the hull 10. Also, a brace or transom plate 18 is welded or is otherwise secured between the flotation tanks 15 and 16 for the purpose of mounting an outboard motor M or other similar power means for moving the apparatus A through a body of water W. The outboard motor M is illustrated by way of example only since the apparatus A may be pulled at the forward end thereof by any other barge, boat or towing device. Even if the apparatus A is pulled or towed, the propeller 20 on the motor M may be utilized for guidance and for assistance in propelling the apparatus A through the body of water W which may be an inland body such as a river or lake, or an offshore body such as the Gulf of Mexico.

Each of the separator units 12 is preferably a conventional centrifugal separator which includes an inlet tube 12a which is preferably tangentially disposed with respect to the body 12b of the separator unit 12. Also, each separator unit 12 includes a discharge or outlet tube 12c which is likewise preferably tangentially disposed with respect to the body 12b. The outlet or discharge tube 12c is at the lower end of the body 12b for the discharge of the heavier liquid, which in this case is water. An opening 12d is provided at the upper end of the body 12b for the discharge of the lighter density liquid, which in this case is essentially all oil, although the oil usually has some water therewith.

The plurality of separator units 12 are arranged so as to form a pocket 25 (FIG. 3) into which the liquid entering the mouth 14 flows so that all, or substantially all, of the liquid entering into the hull 10 through the opening 10a or mouth 14 is confined within such pocket 25 and is thereby picked up by the inlet openings or tubes 12a of the units 12. Preferably, the separator units 12 are disposed at successively lower elevations from the mouth 14 rearwardly as best seen in FIG. 1, and they are all welded or otherwise connected to a support wall 26 which is disposed inside of the hull 10. Additionally, internal baffle plates 27 extend longitudinally between each of the units 12 so that the liquid which enters the pocket 25 is confined in the vicinity of the inlet tubes 12a.

To further support the separator units 12, and to also provide a lower barrier above the discharge tubes 12c, a laterally extending divider plate 28 (FIG. 1) is welded from the forward wall 10e rearwardly to the rear wall 10d. The substantially vertical U-shape support plate 26 preferably rests upon and is welded to the divider plate 28. It is to be noted that the plate 28 slopes downwardly to the rear in accordance with the relative positions of the successively lower separator units 12, so that the discharge pipes 12c are all below the plate 28.

All of the intake or inlet pipes 12a are above such plate 28 so that there is a separation between the incoming fluid and the fluid which is discharged through the openings 12c. The plate 28 forms, together with the hull plates 10b, 10c, 10e and 10f a lower water compartment 30 (FIG. 1) which receives the water which has been separated from the oil-water mixture which has passed through the separator units 12. The water compartment has a tubular discharge pipe 31 extending from the wall 10d so that the water which enters the chamber 30 flows outwardly through the pipe 31. The flow through the pipe 31 is increased by reduced pressure at the rear of the hull 10 due to the movement of the vessel to thereby increase the flow of the liquid through the separator units 12. Additionally, the propeller 20 is preferably surrounded by a duct 21 which is open at both ends and is axially aligned with the pipe 31 to further reduce the pressure at the rear of the hull 10, so that the apparatus A may be operated at higher speeds and to process more liquid through the separator units 12.

A top plate 35 which extends laterally above the pocket 25 and which is inclined from the forward part of the hull 10 rearwardly in accordance with the successively lower positions of the separators 12, serves to further support and unite the separator means 12. Such plate 35 is disposed above the inlet tubes 12a of the separator units 12, and below the upper ends of the units 12, and it is preferably welded to the substantially vertically disposed support 26. Such plate 35 serves to prevent the incoming liquid which is a mixture of the oil and water from splashing over the upper ends of the separator units 12, and thus, such plate 35, together with the plate 26 and the hull plates surrounding same form a separator chamber 36 which separates oil and water from the openings 12d into an upper layer of oil 37 and a lower layer of water 38 by reason of the heavier density water separating out by gravity.

The water 38 may be drained into the chamber 30 through a valved outlet 40 between the chambers 36 and 30 (FIG. 1). Such valved outlet 40 may be controlled from externally of the hull 10, or from the upper end thereof, but for purposes of illustration, the valve is illustrated as being in proximity to the plate 28 in FIG. 1. The oil 37 is pumped from the chamber 36 with a pump 41 or any other suitable pump means having a suction line 41a therewith and a discharge line 41b extending therefrom. The discharge line 41b is connected with any suitable flexible hose or line (not shown) which goes to another storage area which may be another floating barge or storage tank. In some instances, the oil 37 may be left within the apparatus A until reaching land or some other point for the final discharge of the oil to storage or other usage.

The mouth 14 is vertically adjustable and it preferably includes a pair of vertically spaced plates 14a and 14b which define an inclined opening therebetween. The plates 14a and 14b are connected to side plates 14c and 14d (FIG. 3) which are inclined outwardly to form a wide mouth 14. A screen 50 is mounted at the forward end of the mouth 14 to screen out solid materials which might become lodged in the separating units 12, or might otherwise interfere with the operation of the apparatus A.

Figure 3:
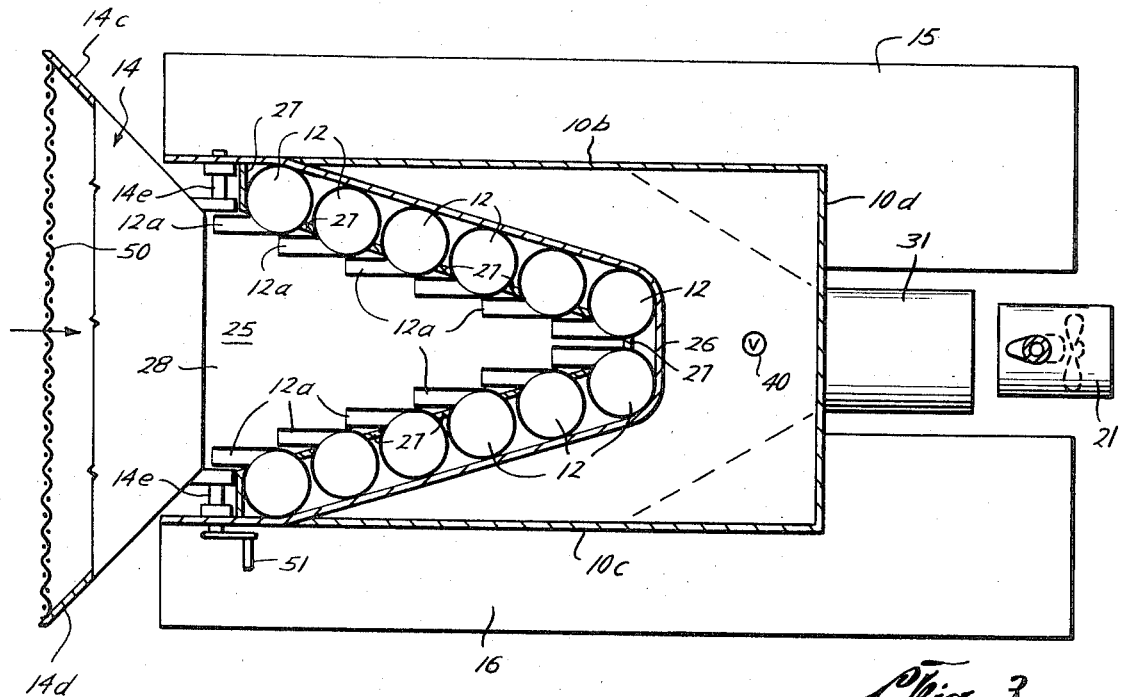
FIG. 3 is a sectional view taken on line 3—3 of FIG. 1.
Figure 4:
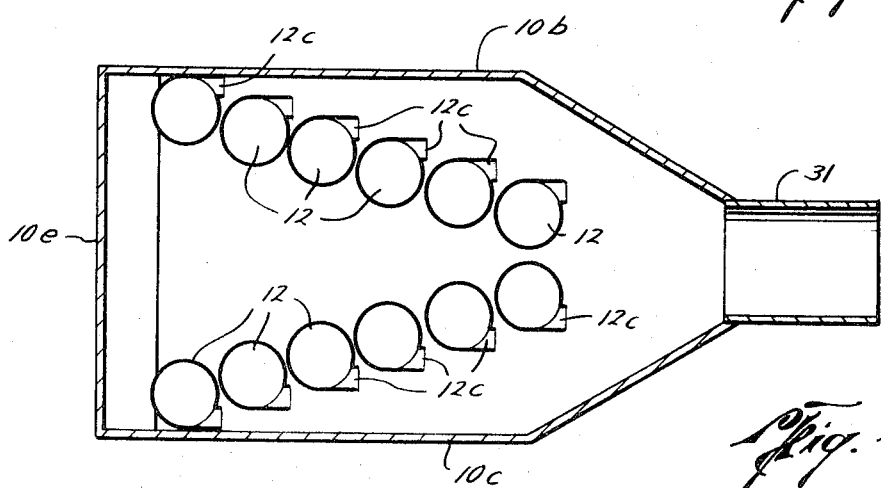
FIG. 4 is a sectional view taken on line 4—4 of FIG. 1.
Figure 5:
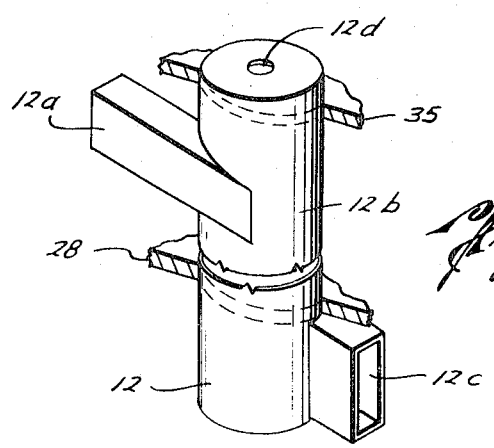
FIG. 5 is an isometric view of one of the separator units preferably employed with the apparatus of this invention.

To provide for the adjustability of the mouth 14 vertically, a pair of pivot lugs or pins 14e are welded or are otherwise secured to the side plates 14c and 14d, and such pivot pins 14e extend through the side walls 10b and 10c of the hull 10 (FIG. 3). An adjustable crank 51 which may be suitably locked by any known means is disposed externally of the hull 10 for moving the mouth 14 to any suitable elevation so that the desired depth of the water W is above the lower plate 14b. Preferably, just the oil or other pollutant P which is floating on the body of water W is to be scooped through the mouth 14, but it will be appreciated that some water must necessarily be also brought into the mouth 14 to be certain that all of the oil or other pollutant P is brought into the pocket 25 defined by the separator units 12. However, a minimum of such water W should be introduced into the apparatus A so as to minimize the amount of separation which is required by the units 12.

A sliding flexible shield 53 is secured to the lower plate 14b (FIG. 1) so that it is slidably engaged with the wall 10e at all times and prevents water from entering the pocket 25. Also, it is preferable to provide a float member 55 at the lower part of the plate 14b of the mouth 14 to assist in maintaining the mouth 14 at the desired elevation for skimming just the surface of the body of water W which has the pollutant P floating thereon. In fact, the float 55 may be the only thing which is relied upon to position the mouth 14 at the desired vertical position in the body of water W.

In the operation of the apparatus A and in carrying out the method of this invention, such apparatus A is either towed, pushed or propelled by its own power means. When the propeller 20 is utilized, it is preferably disposed rearwardly and in line with the pipe 31 to thereby lower the pressure at the outlet from the pipe 31 to increase the flow of liquid through the units 12. The apparatus A may be employed in groups with other apparatus of the same type when it is necessary or desirable to clean up a relatively large area of the pollutant P in a short period of time. With the apparatus A, moving through the water W at a speed of approximately 10 miles per hour or higher, the pollutant P at the surface of the water W, and some of the water W therebelow are forced to flow into the mouth 14 and are guided into the pocket 25 formed by the separator units 12, as well as the plates 27, 28 and 35. The separator units 12 operate in the known manner so that after receiving the incoming liquid through the inlet openings 12a, centrifugal or other super gravity types of separation occurs within the units 12 to cause the lighter density oil to flow through the upper discharge openings 12d, together with some water, while the bulk of the water is discharged through the lower openings 12c. The velocity of the units 12 moving relative to the water and the pollutant P creates at least in part super-gravity separating forces in each unit.

The separated water flows into the water chamber 30 at the lower part of the apparatus A and is discharged or released through the discharge tube 31 at the rear of the apparatus A. The oil with the small amount of water therewith enter the separator compartment or chamber 36 where the separation by gravity of the immiscible liquids occurs, with the oil rising or remaining on the top to form the layer of oil 37 with the water 38 therebelow.

With the present invention, minor oil slicks having relatively low concentration levels such as "rainbow slicks," as well as heavier concentrations of oil on the surface of the water, may be picked up and collected by the apparatus A for storage or for subsequent transfer to another floating unit or land unit by means of the pump 41.

It is to be noted that the apparatus A is largely submerged in the body of water W so that it has very little surface above the water which might be subject to wind and rough seas. Additionally, the length of the apparatus A is approximately equal to the width so that it is stable in rough seas and is therefore usable for the picking up of the oil or other pollutant P even in such weather where other known types of equipment could not be used.

The foregoing disclosure and description of the invention are illustrative and explanatory thereof, and various changes in the size, shape, and materials as well as in the details of the illustrated construction may be made without departing from the spirit of the invention.

What is claimed is:

1. Pollution control apparatus for removing oil or like pollutant from a body of water, comprising:

a hull adapted to be moved through a body of water and having flotation means therewith and an inlet opening and pocket defined by a vertical wall, upper plate and lower plate at the forward end thereof;

a plurality of primary centrifugal separator means mounted in said hull and having inlet means therewith disposed in said pocket along said vertical wall for receiving liquid entering said hull and into said pocket through said inlet opening;

said primary separator means being adapted for separating oil or the like from water in the liquid entering said separator means said hull having a pollutant storage tank therewith;

each of said separator means having a pollutant discharge opening therefrom disposed above said pocket and in direct communication with said storage tank for discharging separated pollutant from said separator means; and each of said separator means having a water discharge opening therefrom disposed below said pocket for discharging the separated water away from said pocket.

2. The apparatus set forth in claim 1, including:
a chamber formed in said hull for receiving said separated water and for discharging same at the rear of said hull.

3. The apparatus set forth in claim 2, including:
means for discharging the separated water from said chamber at the rear of said hull for creating a reduced pressure area to increase the rate of flow of liquid through the separator means for thereby providing an increased rate of separation of the liquid.

4. The apparatus set forth in claim 1, wherein said plurality of separator units are disposed so as to substantially cover the vertical wall of said pocket to thereby receive substantially all of the liquid entering said pocket.

5. The apparatus set forth in claim 4, wherein:
the inlet means for each of said separator units is at a different elevation.

6. The apparatus set forth in claim 1, including:
a mouth member disposed in said inlet opening, and
means mounting said mouth member for vertical adjustment relative to said hull to thereby adjust the depth of the liquid entering said inlet opening so as to obtain a controlled amount of the water with the oil.

7. The apparatus set forth in claim 1, including:
power means on said hull for propelling same with said inlet opening and said pocket in the forward position for increasing the velocity flow of the water and pollutant through said separator means for thereby increasing the speed of separation of the pollutant from the water by said separator means.

8. The apparatus set forth in claim 1, including:
a discharge pipe at the rear wall of said hull through which the separated water flows;
power means having a propeller disposed rearwardly of said discharge pipe; and
a duct surrounding said propeller for further reducing the pressure at the rear of said hull for increasing liquid flow through said separator means.

9. A process for removing floating pollutants from a body of water, comprising the steps of:
floating and moving separator means through a body of water to force floating pollutant on the surface of the water into the separator means;
confining the pollutant in a pocket formed by the separator means opening towards the direction of movement of the separator means;
separating the pollutant from substantially all of the water with said separator means
directing the separated water from the separator means in a direction rearwardly of the direction of movement of the separator means substantially immediately after it is discharged from said separator means; and
said rate of movement of said separator means being sufficient to create a reduced pressure at the discharge area of the separated water to increase the rate of separation of the pollutant from the water as compared to the separation by the separator means alone.

10. The method set forth in claim 9, including:
further separating the pollutant from any water therewith after it is discharged from the separator means.

11. The method set forth in claim 9, including:
discharging the separated pollutant into a chamber which is separated from the water discharged from the separator means.

* * * * *